United States Patent [19]

Munson

[11] Patent Number: 4,969,652

[45] Date of Patent: Nov. 13, 1990

[54] COOLED SHAFT SEAL

[75] Inventor: John H. Munson, Indianapolis, Ind.

[73] Assignee: General Motors Corporation, Detroit, Mich.

[21] Appl. No.: 332,202

[22] Filed: Apr. 3, 1989

[51] Int. Cl.[5] .......................... F02F 11/00; F16J 15/00

[52] U.S. Cl. ........................................ 277/22; 277/96; 277/96.2; 277/235 A; 384/317

[58] Field of Search .............. 277/22, 96, 96.2, 235 A, 277/235 B; 384/277, 320, 317

[56] References Cited

U.S. PATENT DOCUMENTS

| | | | |
|---|---|---|---|
| 1,795,311 | 3/1931 | Meyer | 277/22 |
| 2,956,824 | 10/1960 | Kuchler et al. | 277/22 X |
| 2,966,375 | 12/1960 | Vegezzi | 286/11.14 |
| 2,992,842 | 7/1981 | Shevchenko et al. | 286/9 |
| 3,784,212 | 1/1974 | Doerfling | 277/235 B X |
| 3,905,605 | 9/1975 | Hübner | 277/22 |
| 4,547,082 | 10/1985 | Gerretz et al. | 384/320 X |
| 4,659,282 | 4/1987 | Popp | 415/177 |
| 4,776,759 | 10/1988 | Maskell et al. | 277/22 X |
| 4,779,876 | 10/1988 | Munson | 277/22 X |

FOREIGN PATENT DOCUMENTS

| | | | |
|---|---|---|---|
| 1281798 | 1/1987 | U.S.S.R. | 277/22 |
| 651164 | 3/1951 | United Kingdom | 384/320 |
| 712786 | 7/1954 | United Kingdom | 277/235 A |

OTHER PUBLICATIONS

Bolz & Tuve, "CRC Handbook . . . ", (2nd Ed.), p. 117: Misc. Properties of Metals & Alloys.

*Primary Examiner*—Allan N. Shoap
*Assistant Examiner*—Scott W. Cummings
*Attorney, Agent, or Firm*—Saul Schwartz

[57] ABSTRACT

A seal between a gas turbine engine casing and a high speed shaft on the casing includes a stationary seal ring bearing on an outside cylindrical wall of an annular flange of a seal runner rotatable with the shaft. The annular flange has an inside cylindrical wall bathed in oil for conducting away heat generated at the sliding interface between the seal ring and the annular flange. Heat transfer to the oil is improved by coating the inside cylindrical wall of the annular flange with a thin layer of a metal of higher coefficient of thermal conductivity than the seal runner. The coating is preferably an electro-chemical deposit of silver.

3 Claims, 1 Drawing Sheet

10 32 30 14 42 12 40B 24 22 50 34 26 58 44 40A 54 62 28 16 64 56 18 52 38 36 48 46 60 66 20

COOLED SHAFT SEAL

FIELD OF THE INVENTION

This invention relates to seals for high speed rotating shafts in gas turbine engines.

BACKGROUND OF THE INVENTION

Seals for high speed rotating shafts in gas turbine engines typically include a stationary ring sliding on a cylindrical flange of a seal runner rotating with the shaft. The material for the ring is selected for durability at high temperature and is typically graphite or carbon/graphite. Forces developed during shaft rotation dictate that seal runners be made of alloy steel. Oil is usually sprayed on an inside wall of a cylindrical flange of the seal runner opposite the side where the seal ring bears against the flange. Heat generated at the sliding interface between the seal ring and the runner is conducted radially across the flange and transferred to the oil film on the inside wall. The thermal gradient which motivates heat transfer from the seal runner to the oil is greatest within a band on the inside wall of the seal runner flange which is about as wide as the seal ring. The thermal gradient decreases rapidly outside the band. A shaft seal according to this invention has improved heat transfer outside the usual band of maximum thermal gradient for improved seal ring and seal runner durability.

SUMMARY OF THE INVENTION

This invention is a new and improved seal between a gas turbine engine casing and a high speed rotating shaft supported on the casing. The seal according to this invention includes a stationary ring on the casing, a seal runner on the shaft having a cylindrical flange with an outside cylindrical wall on which the stationary ring bears and an inside cylindrical wall bathed from underneath with cooling oil to remove heat conducted through the flange from the outside cylindrical wall, and a coating on the inside cylindrical wall of the flange of a metal having a higher coefficient of thermal conductivity than the material of the seal runner. The seal runner is typically fabricated from a suitable grade of alloy steel the thermal conducitivity of which is in the range of about 25–30 BTU-FT/HR-FT$^{2}$-° F. The coating is a thin plated deposit of metal the thermal conductivity of which is higher than that of the alloy steel. The effect of the plated coating is maximized by maximizing the difference between the thermal conductivities of the alloy steel and the coating. Silver and copper, 1 having thermal conductivity of 244 BTU-FT/HR-FT$^{2}$-° F. and 222 BTU-FT/HR-FT$^{2}$-° F., respectively, are preferred metals for the plated coating.

DESCRIPTION OF A PREFERRED EMBODIMENT

Figure 1:
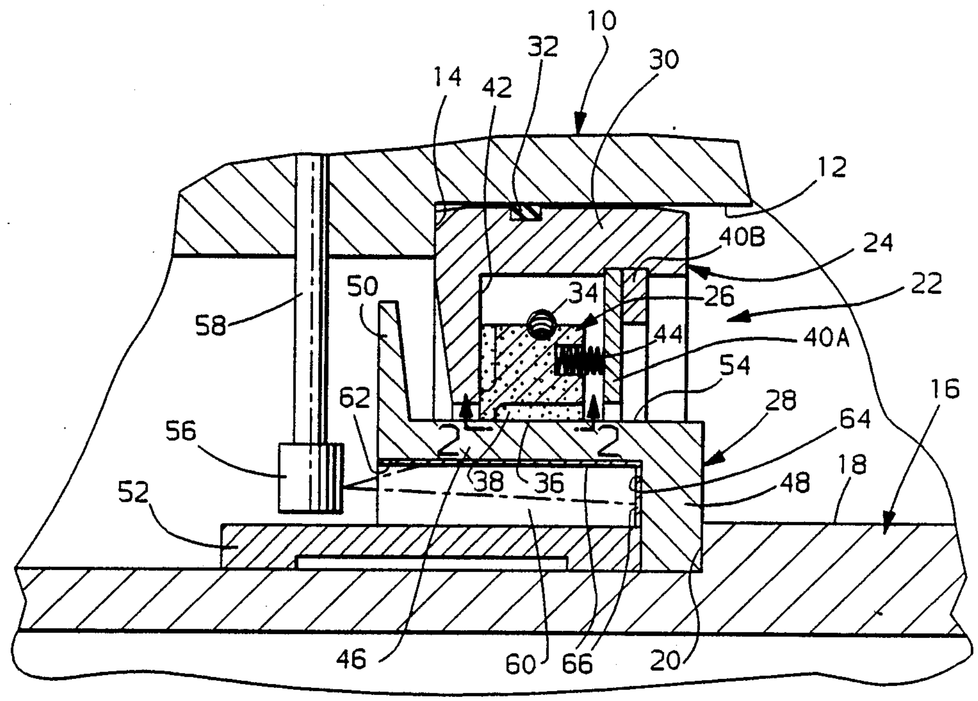
FIG. 1 is a view taken generally along the longitudinal centerplane of a rotating shaft in a gas turbine engine showing in cross section a shaft seal according to this invention.
Figure 2:
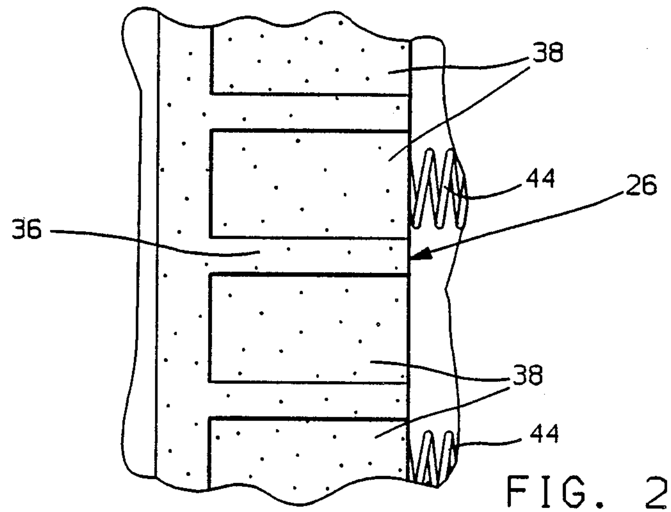
FIG. 2 is a sectional view taken generally along the plane indicated by lines 2—2 in FIG. 1.

Referring to the drawings, a fragmentarily illustrated gas turbine engine includes a casing 10 having an inside cylindrical wall 12 with an annular step 14 therein centered about a rotor axis, not shown, of the engine. The engine further includes a shaft 16 supported on the casing 10 by bearings, not shown, for high speed rotation about the rotor axis. The shaft 16 has an outside cylindrical wall 18 with an annular step 20 therein. A seal 22 according to this invention is disposed between the casing 10 and the shaft 16.

The seal 22 includes an annular cage 24, a seal ring 26, and an annular seal runner 28. The cage 24 has a cylindrical body 30 closely received in the bore 12 and seated against the step 14. Keys or like structural elements, not shown, between the cage 24 and the casing 10 prevent the cage from rotating relative to the bore 12. An elastomeric ring 32 on the cylindrical body 30 seals between the cage 24 and the bore 12.

The seal ring 26 is a conventional composite of a plurality of arcuate segments fabricated from a suitable material such as carbon graphite and held together by a spring 34 around the outside diameter of the ring. The seal ring has an inside cylindrical wall 36 interrupted by a plurality of relief notches 38 and is retained within the cage 24 by a pair of annular retainers 40A-B on the cage body 30. A plurality of springs between the annular retainer 40A and the seal ring urges the seal ring against an annular wall 42 of the cage, only a single spring 44 being shown in FIG. 1. The seal ring 26 is prevented from rotating relative to the cage 24 by keys or like elements, not shown, between the cage and seal ring.

The seal runner 28 has a cylindrical flange 46 bounded at one end by a first annular shoulder 48 extending radially in and at the other end by a second annular shoulder 50 extending radially out. The first annular shoulder is closely received on the outside wall 18 of the shaft 16 and is captured between the step 20 on the shaft and a retaining collar 52 on the shaft such that the seal runner is rotatable as a unit with the shaft 16. The inside cylindrical wall 36 of the seal ring 26 bears against an outside cylindrical wall 54 of the seal runner and is biased toward the outside cylindrical wall 54 by the spring 34. A gas seal is defined at the sliding interface between the inside cylindrical wall 36 of the seal ring and the outside cylindrical wall 54 of the runner.

An oil nozzle 56 on the end of a pipe 58 on the casing 10 of the engine directs a spray of cooling oil toward an annulus 60 defined between the outside cylindrical wall 18 of the shaft 16 and an inside cylindrical wall 62 of the cylindrical flange 46 of the seal runner. The annulus 60 is closed by a facing surface 64 of the first annular shoulder 48 of the seal runner. The oil spray bathes the inside cylindrical wall 62 and the facing surface 64 of the annular shoulder 48 with a thin film of oil which, as described below, conducts away heat generated by friction at the sliding interface between the inside cylindrical wall 36 on the seal ring and the outside cylindrical wall 54 on the seal runner.

The seal runner is typically fabricated from a suitable grade of alloy steel the thermal conductivity of which is in the range of about 25–30 BTU-FT/HR-FT$^{2}$-° F. Because these alloy steels are relatively poor conductors of heat, the frictional heat generated at the sliding seal interface does not migrate throughout the seal runner. Instead, heat migration toward the inside cylindrical wall 62 is confined primarily to an annular section of the cylindrical flange 46 about the same width as the seal ring 26 and immediately radially inboard thereof. This pattern of heat migration produces a high thermal gradient between the oil and a band of the inside cylindrical wall 62 as wide as the aforesaid annular section of the flange 46 which rapidly decreases outside the band. Accordingly, in prior seals having seal rings and seal runners similar to seal ring 26 and seal runner 28 of seal 22, heat transfer is primarily confined to the aforesaid band immediately radially inboard of the seal ring.

In the seal according to this invention, however, heat transfer to the oil film is facilitated by increasing the thermal gradient outside the width of the aforesaid band. More particularly, in the seal runner 28 of the seal 22 according to this invention, the inside cylindrical wall 62 of the flange 46 and the facing surface 64 of the annular shoulder 48 have a layer or coating 66 of metal thereon selected from a group consisting of silver having thermal conductivity of 244 BTU-FT/HR-$FT^2$-° F. or copper having thermal conducitivity of 222 BTU-FT/HR-$FT^2$-° F. The thickness of the coating is illustrated in exaggerated fashion in FIG. 1 and may be in a range of from 0.0001 to 0.001 inches. Coating thickness exceeding 0.001 inches produces little further cooling gain. The coating can be applied in any conventional fashion but is preferably electro-chemically deposited by plating. For gas turbine applications, silver is a preferred metal.

Both silver and copper are superior heat conductors as compared to the alloy steel of the seal runner 28. In seal runner 28, the frictional heat confined to the aforesaid narrow band radially inboard of the seal ring is conducted or spread by the coating 66 over a broader expanse of the inside cylindrical wall 62 and facing surface 64. The heat thus conducted from the aforesaid band increases the thermal gradient between the oil film and the seal runner 28 over a correspondingly wider expanse of the inner cylindrical wall and facing surface so that more heat is transferred to the oil. The additional heat transfer produces lower peak temperatures at the sliding interface between the seal ring and the outside cylindrical wall 54 and correspondingly improved seal ring and seal runner durability.

The embodiments of the invention in which an exclusive property or privilege is claimed are defined as follows:

1. In a gas turbine engine having a casing defining an axis, a shaft means supported on said casing for rotation about said axis, a seal ring supported on said casing around said shaft means and including an inside cylindrical wall having a first width dimension, a seal runner rotatable as a unit with said shaft means fabricated from a metal having a first coefficient of thermal conductivity and including a cylindrical flange having an outside cylindrical wall in sliding engagement with said seal ring inside cylindrical wall and an inside cylindrical wall spaced radially outboard of said shaft means with a second width dimension exceeding said first width dimension, and means on said engine directing a spray of oil toward said cylindrical flange inside cylindrical wall to define a cooling oil film on said cylindrical flange inside cylindrical wall, the improvement comprising: means defining on said cylindrical flange inside cylindrical wall a coating of a metal having a second coefficient of thermal conductivity greater than said first coefficient of thermal conductivity and extending substantially fully across said second width dimension thereby to increase heat transfer between said cylindrical flange inside cylindrical wall and said cooling oil film.

2. The seal recited in claim 1 wherein said metal having said second coefficient of thermal conductivity is selected from a group consisting of copper and silver.

3. The seal recited in claim 2 wherein said coating is an electro-chemical deposit of silver on said cylindrical flange inside cylindrical wall having a radial thickness of between about 0.0001 inch and 0.001 inch.

* * * * *